(12) United States Patent
Nie et al.

(10) Patent No.: US 10,857,496 B2
(45) Date of Patent: Dec. 8, 2020

(54) DEMISTER

(71) Applicant: JIANGSU LANSHAN ENVIRONMENT TECHNOLOGY CO., LTD., Nanjing, Jiangsu Province (CN)

(72) Inventors: Jiangning Nie, Nanjing (CN); Bin Ling, Nanjing (CN); Jiali Xu, Nanjing (CN)

(73) Assignee: JIANGSU LANSHAN ENVIRONMENT TECHNOLOGY CO., LTD., Jiangsu (CN)

( * ) Notice: Subject to any disclaimer, the term of this patent is extended or adjusted under 35 U.S.C. 154(b) by 245 days.

(21) Appl. No.: 16/060,906

(22) PCT Filed: Dec. 6, 2016

(86) PCT No.: PCT/CN2016/108700
§ 371 (c)(1),
(2) Date: Jun. 8, 2018

(87) PCT Pub. No.: WO2017/097185
PCT Pub. Date: Jun. 15, 2017

(65) Prior Publication Data
US 2018/0353888 A1 Dec. 13, 2018

(30) Foreign Application Priority Data
Dec. 8, 2015 (CN) .......................... 2015 1 0897113

(51) Int. Cl.
*B01D 45/12* (2006.01)
*B01D 45/16* (2006.01)
(Continued)

(52) U.S. Cl.
CPC ............. *B01D 45/16* (2013.01); *B01D 45/12* (2013.01); *B01D 53/78* (2013.01); *B04C 3/06* (2013.01);
(Continued)

(58) Field of Classification Search
CPC .................... B01D 45/16; B01D 53/78; B01D 2258/0283; B01D 19/0057; B01D 45/12; B04C 3/06; B04C 2003/006
See application file for complete search history.

(56) References Cited

U.S. PATENT DOCUMENTS 1,735,298 A * 11/1929 Pfeffer ...................... B04C 3/04
55/343
1,809,375 A * 6/1931 Chase .................... F02M 29/06
48/189.2
(Continued)

*Primary Examiner* — Dung H Bui
(74) *Attorney, Agent, or Firm* — Proi Intellectual Property US; Klaus Michael Schmid

(57) ABSTRACT

The present invention discloses a novel demister, comprising at least one demisting unit; wherein the demisting unit comprises a glow guide cylinder, a cyclone blade group mounted at a gas inlet of the glow guide cylinder and a liquid collection cylinder arranged outside the flow guide cylinder, wherein the liquid collection cylinder is provided with at least one glow guide cylinder, a water permeable structure is arranged on a side wall of the flow guide cylinder, and a gap is defined between an outer wall face of the flow guide cylinder and an inner wall face of the liquid collection cylinder and an interlayer chamber is formed.

9 Claims, 14 Drawing Sheets

(51) Int. Cl.
    *B01D 53/78*     (2006.01)
    *B04C 3/06*     (2006.01)
    *B01D 19/00*     (2006.01)
    *B04C 3/00*     (2006.01)

(52) U.S. Cl.
    CPC .. *B01D 19/0057* (2013.01); *B01D 2258/0283* (2013.01); *B04C 2003/006* (2013.01)

(56) References Cited

U.S. PATENT DOCUMENTS

| | | | | |
|---|---|---|---|---|
| 2,201,301 A * | 5/1940 | Richardson | B04C 3/04 | 55/397 |
| 2,662,610 A * | 12/1953 | Heinrich | B04C 3/06 | 55/347 |
| 3,360,909 A * | 1/1968 | Barnerias | B04C 5/081 | 55/348 |
| 3,421,296 A * | 1/1969 | Beurer, Sr. | F02C 7/052 | 55/306 |
| 3,443,368 A * | 5/1969 | Wilson | B04C 5/085 | 55/435 |
| 3,517,821 A * | 6/1970 | Keller | B04C 3/06 | 210/512.1 |
| 3,543,485 A * | 12/1970 | Hardison | B04C 3/00 | 55/398 |
| 3,825,212 A * | 7/1974 | Darges | B64D 13/08 | 244/118.5 |
| 3,915,679 A * | 10/1975 | Roach | B04C 3/04 | 55/347 |
| 4,008,059 A * | 2/1977 | Monson | B01D 45/14 | 55/396 |
| 4,050,913 A * | 9/1977 | Roach | B01D 50/002 | 96/381 |
| 4,162,906 A * | 7/1979 | Sullivan | B04C 3/00 | 210/512.1 |
| 4,242,115 A * | 12/1980 | Harold | B01D 45/16 | 55/347 |
| 4,289,611 A * | 9/1981 | Brockmann | B04C 3/04 | 209/710 |
| 4,311,494 A * | 1/1982 | Conner | B01D 45/16 | 55/394 |
| 4,420,314 A * | 12/1983 | Barron, Jr. | B04C 5/06 | 55/436 |
| 4,629,481 A * | 12/1986 | Echols | B01D 45/16 | 122/34 |
| 4,966,703 A * | 10/1990 | Kalnins | B01D 17/0217 | 210/512.1 |
| 5,149,341 A * | 9/1992 | Taylor | B01D 19/0057 | 118/603 |
| 5,320,652 A * | 6/1994 | Akel | F22B 37/322 | 55/320 |
| 5,480,464 A * | 1/1996 | De Villiers | B01D 39/1615 | 55/320 |
| 6,884,273 B2 * | 4/2005 | Kopec | B01D 45/12 | 210/512.2 |
| 7,279,020 B2 * | 10/2007 | Christiansen | B04C 3/06 | 55/338 |
| 8,002,866 B2 * | 8/2011 | Kondo | F22B 37/327 | 55/457 |
| 8,025,706 B2 * | 9/2011 | Poorte | B01D 19/0036 | 55/346 |
| 8,746,464 B2 * | 6/2014 | Maier | B01D 45/16 | 210/512.1 |
| 9,192,886 B2 * | 11/2015 | Nieuwoudt | B01D 50/002 | |
| 9,234,484 B2 * | 1/2016 | Lewington | F02M 35/10013 | |
| 9,782,701 B2 * | 10/2017 | Ackermann | B04C 3/04 | |
| 10,286,407 B2 * | 5/2019 | Correia | F01D 5/081 | |
| 10,427,172 B2 * | 10/2019 | Altorf | B23P 15/02 | |
| 2008/0110140 A1 * | 5/2008 | Egger | B01D 45/16 | 55/337 |
| 2009/0205489 A1 * | 8/2009 | Miemiec | B01D 45/16 | 95/35 |
| 2010/0275561 A1 * | 11/2010 | Lundquist | B04C 3/00 | 55/456 |
| 2012/0117928 A1 * | 5/2012 | Kondo | B01D 45/14 | 55/442 |
| 2013/0152525 A1 * | 6/2013 | Brandner | B01D 45/16 | 55/447 |
| 2015/0273375 A1 * | 10/2015 | Krishnamurthy | B04C 3/04 | 95/269 |
| 2018/0169553 A1 * | 6/2018 | Billiet | B01D 45/08 | |

* cited by examiner

DEMISTER

TECHNICAL FIELD

The present invention relates to gas-liquid separation devices used in the industrial field, and in particular, relates to a novel demister suitable for industrial applications.

BACKGROUND

Gas-liquid separation is a process that is commonly used in the industrial field. In the course of wet desulfurization, smaller slurry particle size promotes the gas-liquid reaction speed. However, the flue gas upon desulfurization may thus fully contain slurry mist droplets, and the small particle-size mist droplets may be simply carried and discharged over the gas flow, which thereby causes contamination and severe corrosion of the blower, heat exchanger and flue gas passage. Therefore, the purified flue gas needs to be subjected to demisting before leaving the absorption tower. Most of the conventional demisters may achieve a demisting efficiency of over 70% against 20-micron mist droplets, but only has a demisting efficiency of about 30% against 10-micron mist droplets. Failure to accommodate the standards for the particles at the outlet of the desulfurization tower is mainly due to the particles carried out by the mist droplets. An effective solution regarding to this issue is to reduce the mist droplets or reduce discharge of the mist droplet particles, that is, to improve the gas-liquid separation efficiency of the purified flue gas.

SUMMARY

To solve the problems that conventional purification devices achieve a low removal efficiency against small-particle size mist droplets and the concentration of the mist droplets and particles at a gas inlet fail to accommodate specified standards, the present invention provides a novel demister achieving a high mist removal efficiency.

The present invention discloses the following technical solution:

A novel demister comprises at least one demisting unit; wherein the demisting unit comprises a glow guide cylinder, a primary cyclone blade group mounted at a gas inlet of the glow guide cylinder and a liquid collection cylinder arranged outside the flow guide cylinder, wherein the liquid collection cylinder is provided with at least one glow guide cylinder, a water permeable structure is arranged on a side wall of the flow guide cylinder, and a gap is defined between an outer wall face of the flow guide cylinder and an inner wall face of the liquid collection cylinder and an interlayer chamber is formed.

Based on the above solution, a further improved and preferred technical solution is as follows:

A bottom plate is arranged under the interlayer chamber, a recess portion is arranged on a wall of the liquid collection cylinder corresponding to at a lowest position; wherein the recess portion is arranged under the lowest position of the bottom plate and is in communication with the interlayer chamber, such that a liquid collected in the interlayer chamber flows out of the liquid collection cylinder via the recess portion.

To ensure that the mist droplets collected in the flow guide cylinder are more effectively discharged into the interlayer chamber, the interlayer chamber may be connected to an external device, thus to form a negative pressure relative to the gas pressure in the flow guide cylinder. In addition, when the demister is used in separation of clean mist droplets in the gas, a water absorptive material may be added in the interlayer chamber.

When the demister is used for separating extremely small-particle size mist droplets, for example, mist droplets in the range of tens to hundreds of nanometers, several secondary blade groups may be additionally arranged at the rear section of the primary cyclone blade groups in the flow guide cylinder. To prevent an increase of the pressure loss in the demister caused by an increase of the number of layers of blade groups, the central member of the secondary cyclone blade group is defined as a hollow cylinder. However, relative to the position of the gas inlets of the blades of the secondary cyclone blade group, the central member extends by a section on the side of incident-flow. Correspondingly, the interlayer chamber is also isolated into separate chamber units, wherein each chamber unit is configured to collect the liquid droplets separated by each layer of cyclone blade group. The liquid collection cylinders of adjacent demisting units are connected to each other via a clamping member; wherein the clamping member is provided with a base, a claw fixed above the base and a water discharge tube connected under of the base, when adjacent demisting units are fixed, and the clamping member is clamped at the position of the recess portion of the liquid collection cylinder, such that the recess portion is in communication with the water discharge tube.

The wall of the liquid collection cylinder is constituted by several wall plates in sequence, an included angle of adjacent wall plates being 120 degrees, and the recess portion is arranged at the corner of the liquid collection cylinder.

The water permeable structure of the flow guide cylinder may employ any one of the following:

a) the wall of the flow guide cylinder is circumferentially provided with the water permeable structure formed by a plurality of slots;

b) the entire or partial cylinder body of the flow guide cylinder is formed by enclosure of a plurality of baffles, wherein a gap defined between the baffles to form the water permeable structure, and the baffle is a straight plate or a curved plate; and c) the wall of the flow guide cylinder is provided with a water permeable mesh, membrane or filter cloth.

Preferably, a cross section of the curved plate is an arc curve whose curvature progressively increases along a gas flow direction.

The cyclone blade group comprises a plurality of blades that are annularly arranged and a supporting member for fixing the blades, adjacent blades form an oblique flow passage, and the blade comprises a section of curved plate; wherein a cross section of the curved plate is a gradually-varied arc curve whose curvature progressively increases along the gas flow direction.

The blade extends at a gradually-bending end of the curved plate to form a section of straight plate.

Preferably, the arc curve (of the flow guide cylinder and the blade) is a corrected involute, and the curve equation is:

$$\begin{cases} x = k*r*(\cos\varphi + \varphi*\sin\varphi) \\ y = r*(\sin\varphi - \varphi*\cos\varphi) \\ k = 0.3\text{-}3 \end{cases}$$

wherein $\varphi$ is a spread angle, r is a base circle radius, and k is a correction coefficient.

Beneficial Effects:

The demister according to the present invention is mounted in a gas treatment device for use, and the gas entering the demister flows through the primary cyclone blade groups to form a rotary flow centering the central axis of the flow guide cylinder. The mist droplets carried in the flue gas are thrown to the all of the flow guide cylinder, enter the interlayer chamber between the flow guide cylinder and the liquid collection cylinder via the water permeable structure on the wall of the glow guide cylinder, and then are discharged from the chamber, such that gas and liquid passages during demisting are separated. In this way, secondary carrying of the mist droplets in the gas is reduced, and the demisting efficiency is remarkably improved. With a further combination with the preferred demisting blades, in the course where the gas flows through the cyclone blade groups, gradually-varied arc curve of the blades enables the liquid droplets or dusts to be captured by the curved surfaces of the blades under the constantly-varying inertia force. Therefore, the demisting efficiency is high. The demister according to the present invention is novel is structure design, and is simple to manufacture. The design of the demisting units also facilitates manufacture, transportation, disassembly and repair. The demisting units may be spliced to form demister groups having different diameters and numbers of layers. The resistance may be adjusted according to the arrangement of the layers, and the use of the demister is flexible.

DETAILED DESCRIPTION

Figure 1:
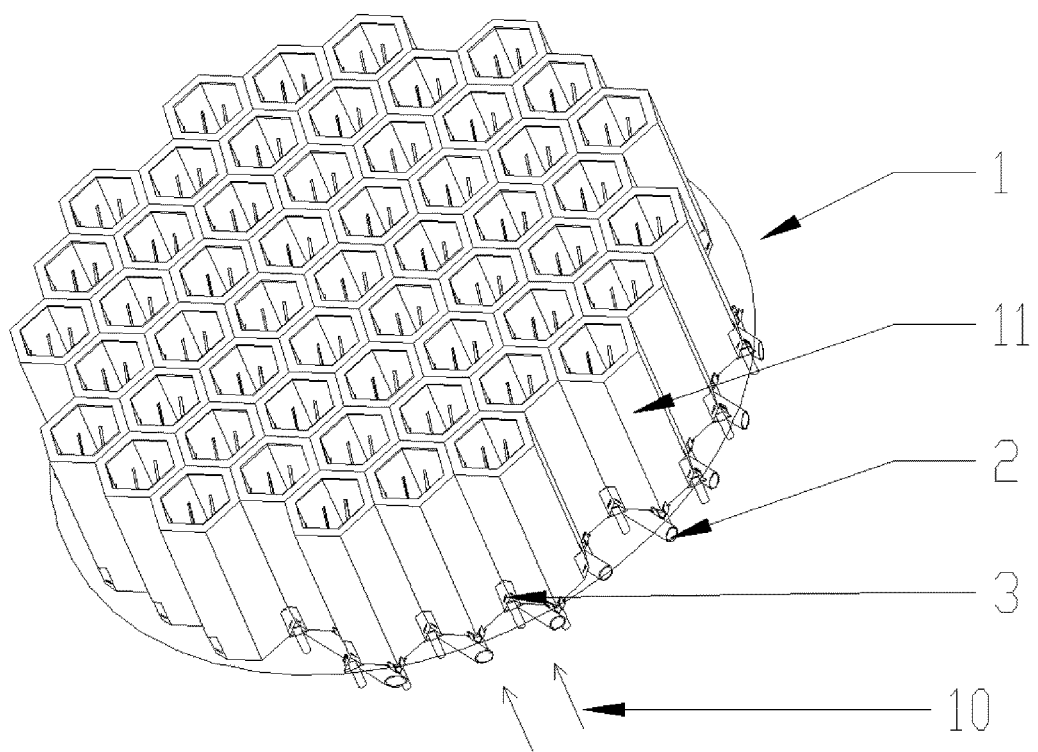
FIG. 1 is a schematic structural three-dimensional top view of a demister according to Embodiment 1 of the present invention.
Figure 2:
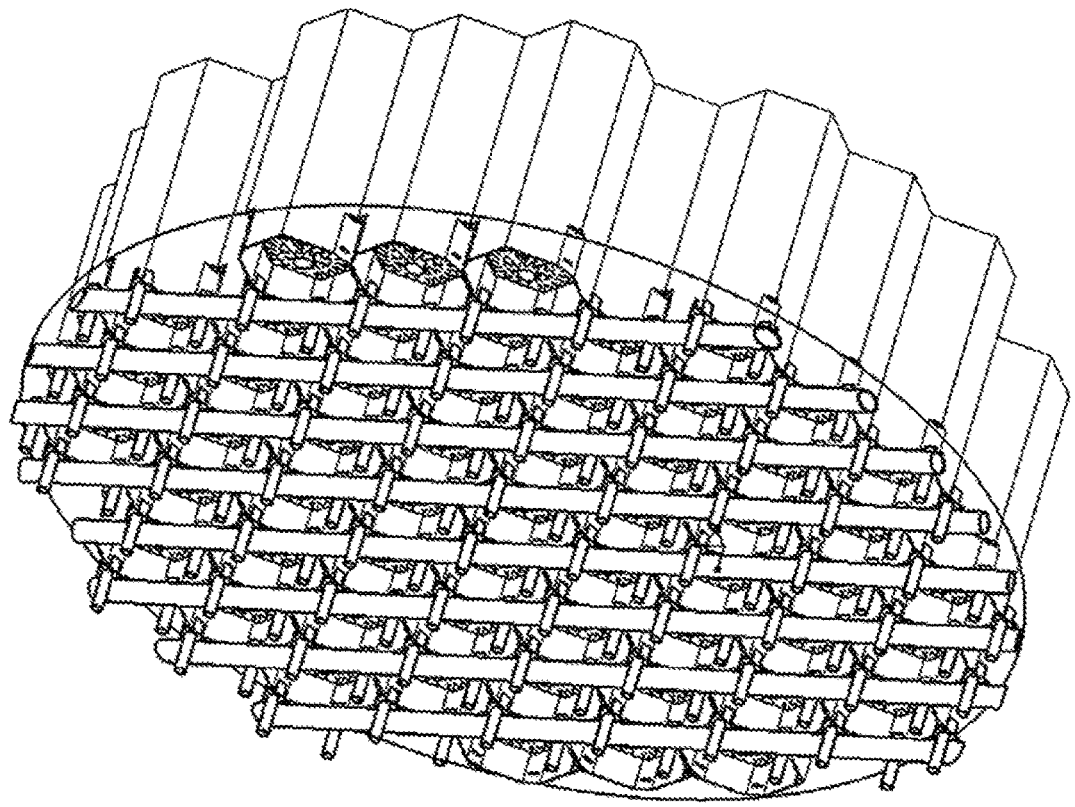
FIG. 2 is a schematic structural three-dimensional bottom view of the demister in FIG. 1.
Figure 3:
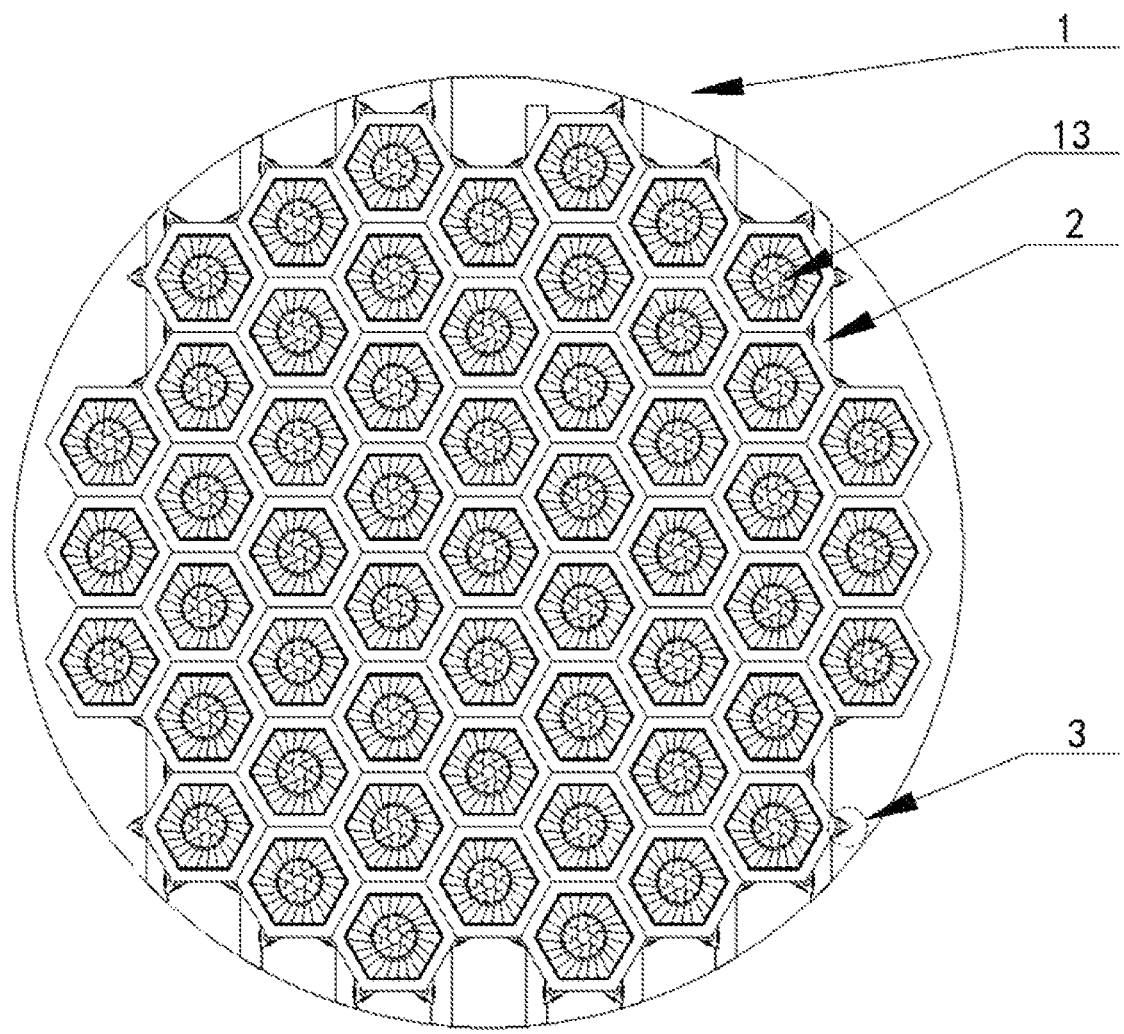
FIG. 3 is a schematic structural bottom view of the demister in FIG. 1.

For elaboration the technical solution and design principle of the present invention, the present invention is further described hereinafter with reference to the accompanying drawings and specific embodiments.

Embodiment 1

As illustrated in FIG. 1, FIG. 2, FIG. 3 and FIG. 6, a novel demister comprises a plurality of demisting units 1 spliced as a cellular shape; wherein the demisting unit 1 comprises a liquid collection cylinder 11, a flow guide cylinder 12 and a primary cyclone blade group 13. The liquid collection cylinder 11 is arranged on the periphery of the flow guide cylinder 12, and each liquid collection cylinder 11 is provided with at least one flow guide cylinder 12. The primary cyclone blade group 13 is mounted in the flow guide cylinder 12, and is positioned at a gas inlet end thereof. A side wall of the flow guide cylinder 12 is provided with a water permeable structure, and a gap is defined between an outer wall face of the flow guide cylinder 12 and the liquid collection cylinder 11, to thus form an interlayer chamber 14 through which water flows. The bottom of the interlayer chamber 14 is in communication with an external water discharge mechanism.

Figure 7:
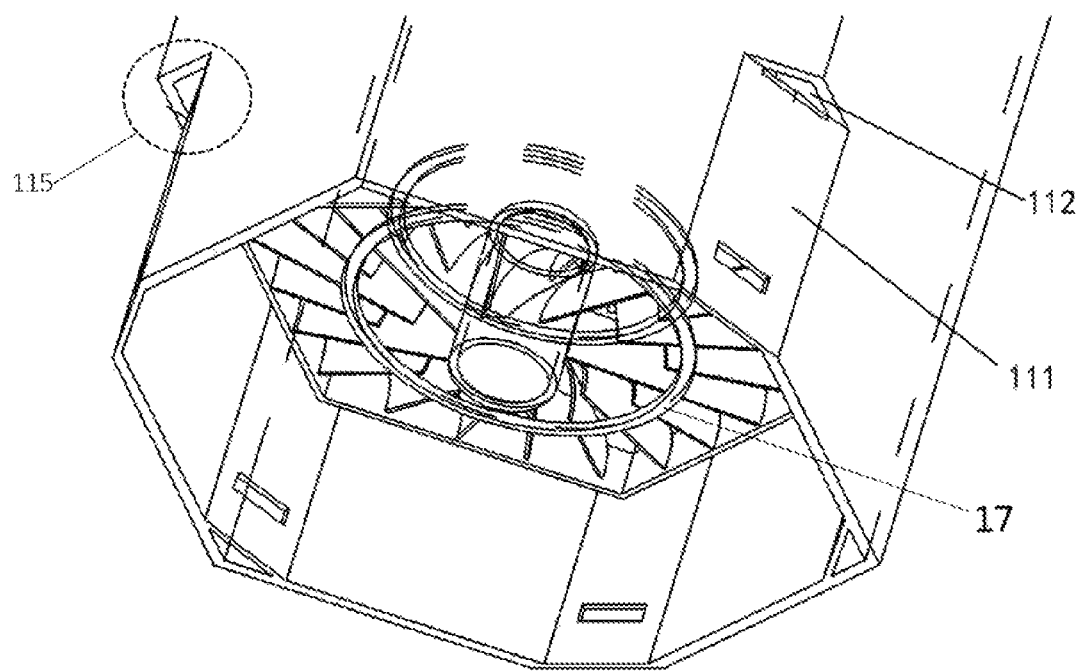
FIG. 7 is a schematic structural view of a recess portion on the liquid collection cylinder.
Figure 8:
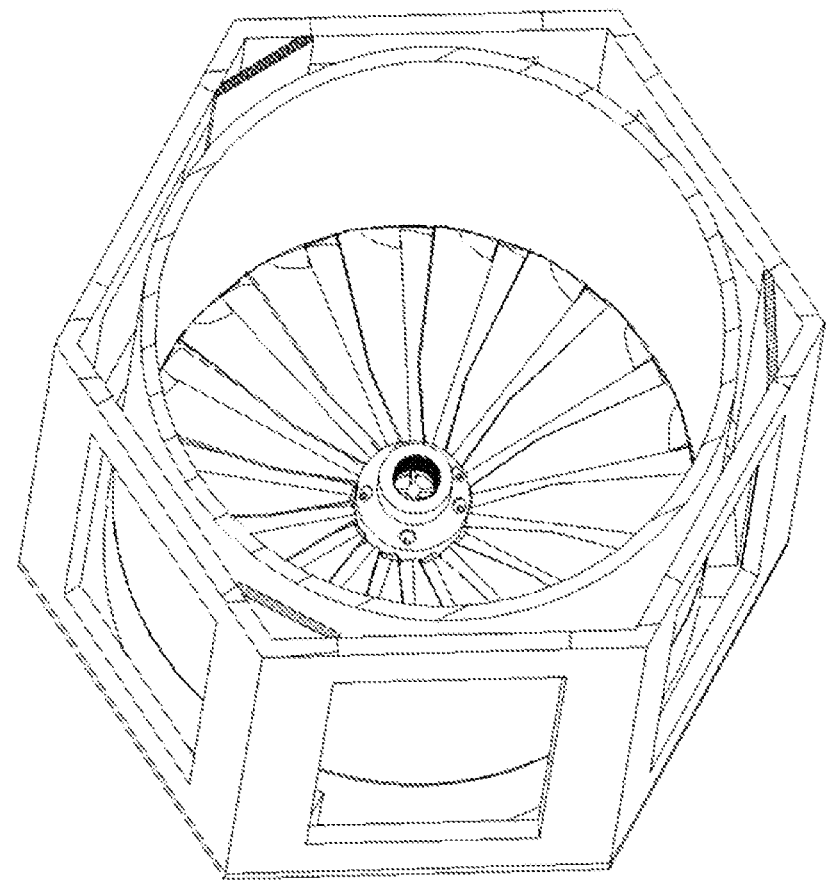
FIG. 8 is another schematic structural partial sectional view of the demisting unit.
Figure 9:
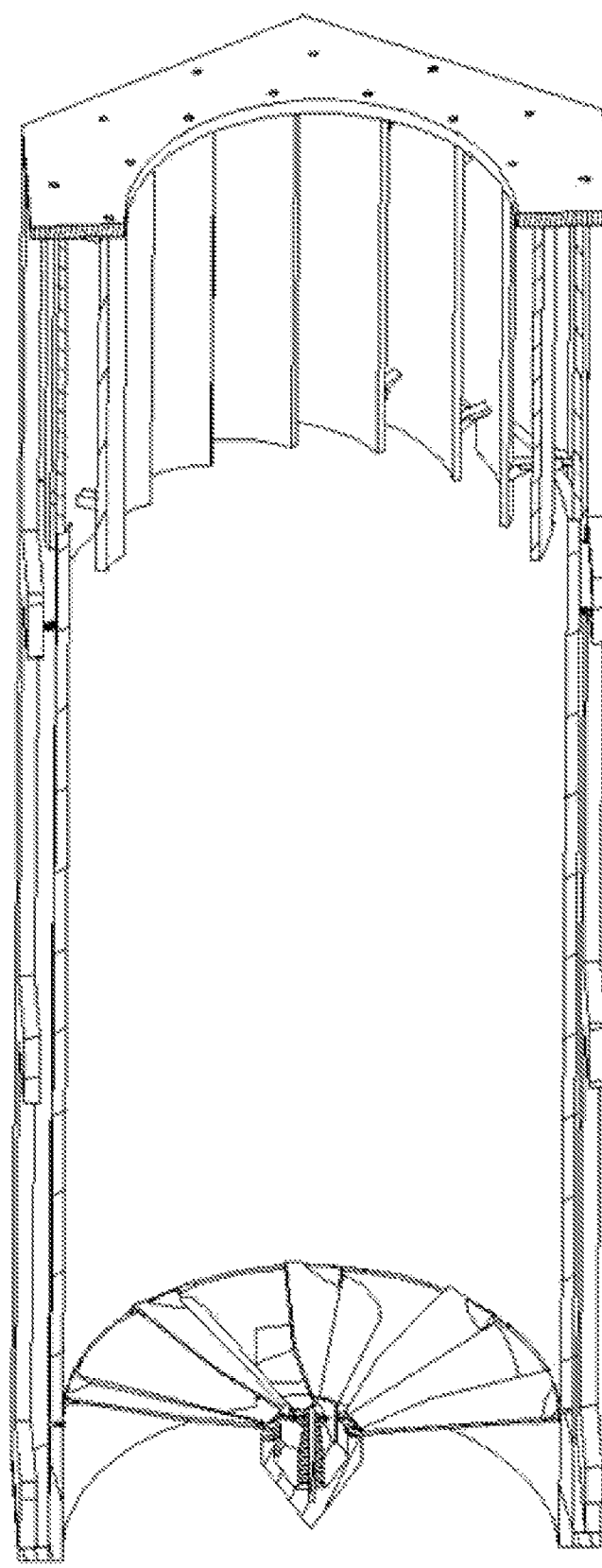
FIG. 9 is still another schematic structural partial sectional view of the demisting unit.

The cylinder body of the liquid collection cylinder 11 is an equilateral hexagon, which facilitates seamless splicing of the adjacent demisting units. A butterfly-shaped bottom plate is arranged under the interlayer chamber 14, wherein the lowest position of the bottom plate is at the corner of the liquid collection cylinder 14. Corresponding to the lowest position of the bottom plate, the wall of the liquid collection cylinder 11 is provided with a chamfered short cut surface 111, to thus form a recess portion. As illustrated in FIG. 1 and FIG. 7, the recess portion is positioned under the lowest position of the bottom plate of the interlayer chamber 14, and passes through a water permeable hole 112 and is in communication with the interlayer chamber 14, such that the liquid deposited in the interlayer chamber 14 flows out of the liquid collection cylinder 11 via the recess portion, which facilitates discharge of the deposited liquid. The flow guide cylinder 12 may be defined as a cylinder or an equilateral hexagon.

Figure 13:
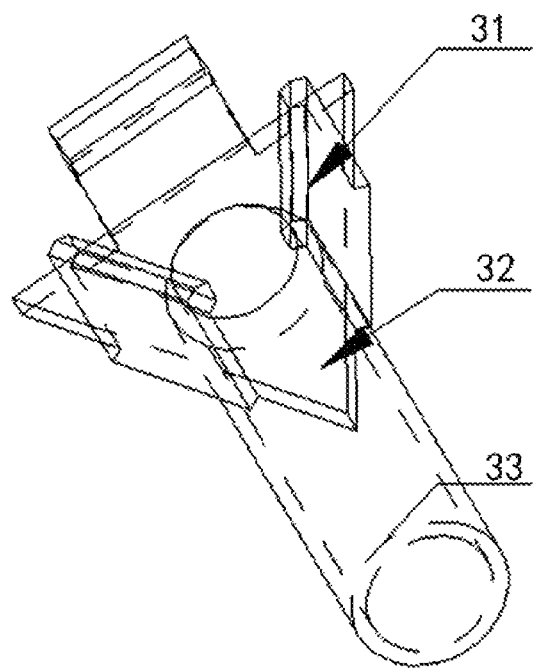
FIG. 13 is a schematic structural three-dimensional view of a clamping structure according to an embodiment of the present invention.
Figure 14:
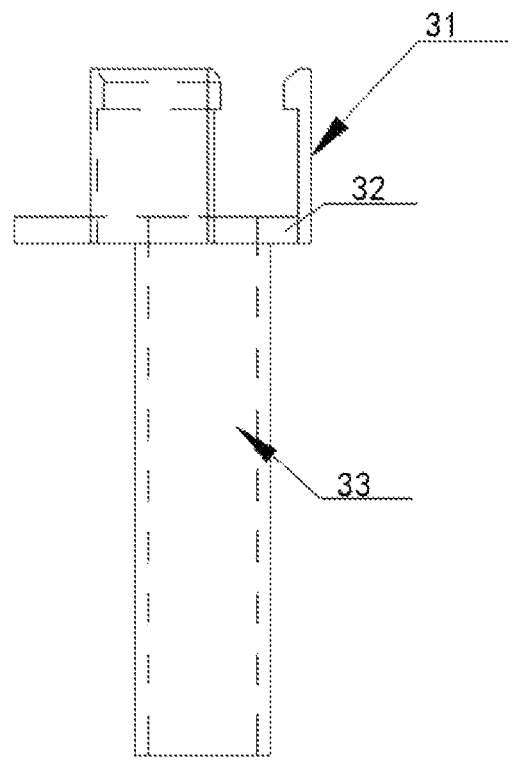
FIG. 14 is a schematic structural side view of the clamping structure in FIG. 13.
Figure 15:
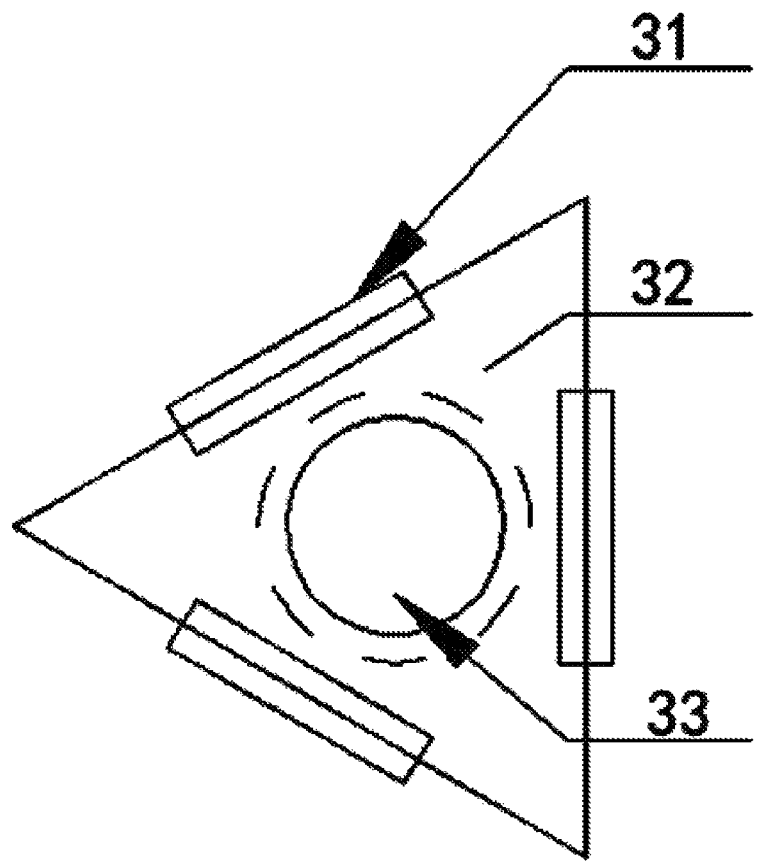
FIG. 15 is a schematic structural top view of the clamping structure in FIG. 13.
Figure 16:
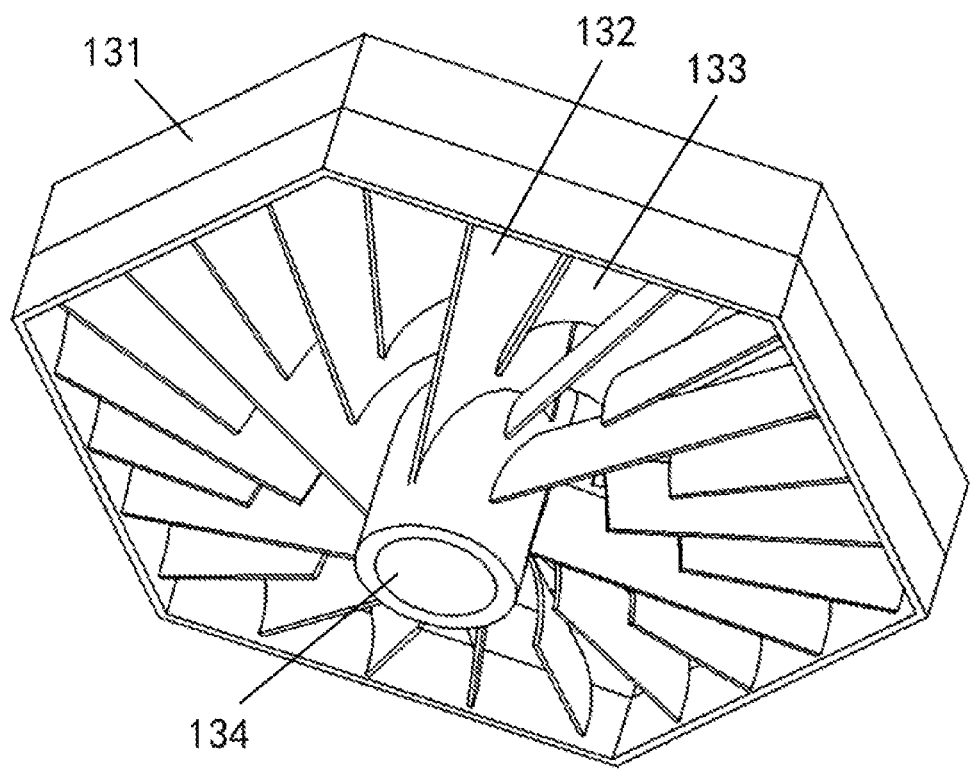
FIG. 16 is a schematic structural view of a cyclone plate according to an embodiment of the present invention.

The liquid collection cylinders 11 of the adjacent demisting units are connected via a clamping member 3. As illustrated in FIG. 13, FIG. 14 and FIG. 15, the clamping member 3 is provided with a triangular base 32, three claws 31 fixed above the base and a water discharge 33 tube connected under the base. When the adjacent demisting units need to be fixed, the clamping member 3 is clamped to the position where three adjacent demisting units are interconnected to each other, and the chamfered short cut surface 111 of the liquid collection cylinder is provided with a corresponding clamping mouth. After the three adjacent demisting units are interconnected to each other, three liquid collection cylinders 11 are spliced at the recess portion of the interconnection to form a triangular prism chamber. The base 32 of the clamping member 3 blocks from the bottom the triangular prism chamber, such that the deposited liquid flowing out of the interlayer chamber 14 are collected to the water discharge tube 33 of the clamping member 2 via the recess portion and directly discharged via the water discharge tube 33, or such that the water discharge tube 33 is connected to a crossarm pipe 2 supporting the demister and discharged outside the purification system via the crossarm pipe 2.

The primary cyclone blade group 13 comprises a plurality of blades and a supporting mechanism for supporting the blades; wherein the supporting member comprises an outer frame 131 and a central member 134, the blades are annularly arranged in the frame 131, and an oblique flow passage is formed between two adjacent blades. The blades in the blade group comprise long blades 132 and a plurality of short blades 133 having different lengths; wherein an inner end of the long blade is fixed to the central member 134, and an outer end of the blade is connected to the frame 131; and each short blade is arranged between two long blades 132, an outer end of the short blade is fixed to the frame 131, and an inner end is not in contact with the central member 134. By virtue of the above arrangement, the blades are prevented from being distributed over-densely at the central member, and a great resistance is avoided, and pressure loss of the gas is prevented. To increase the fixing strength of the short blades, a supporting ring 17 may be arranged under and above the blade, such that the center of each blade is connected to the supporting ring 17.

Figure 17:
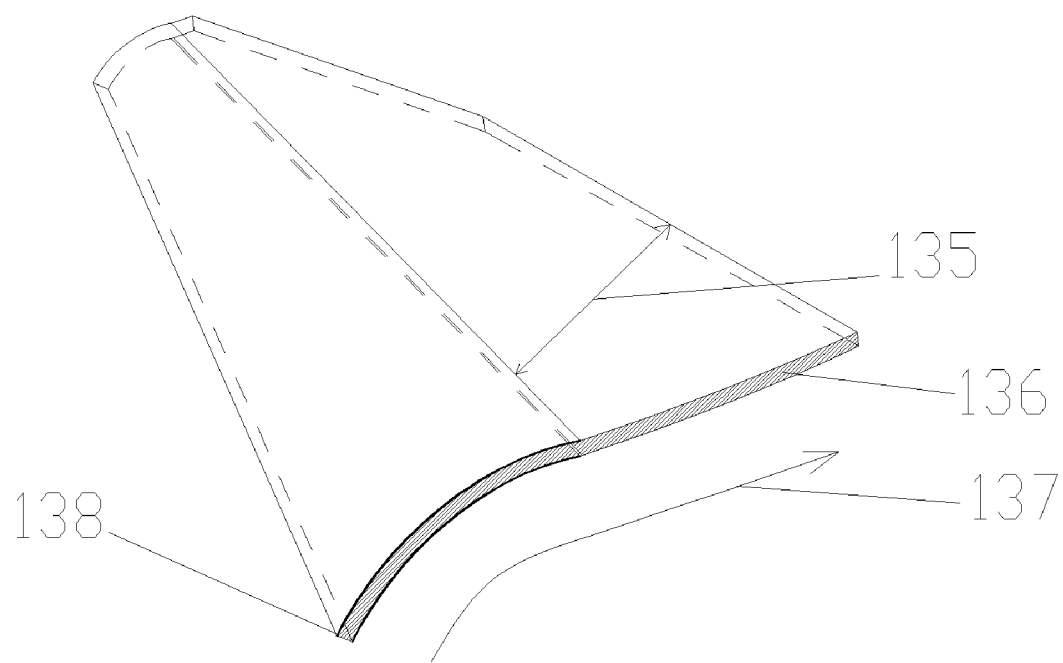
FIG. 17 is a schematic structural view of a blade according to Embodiment 1 of the present invention.
Figure 18:
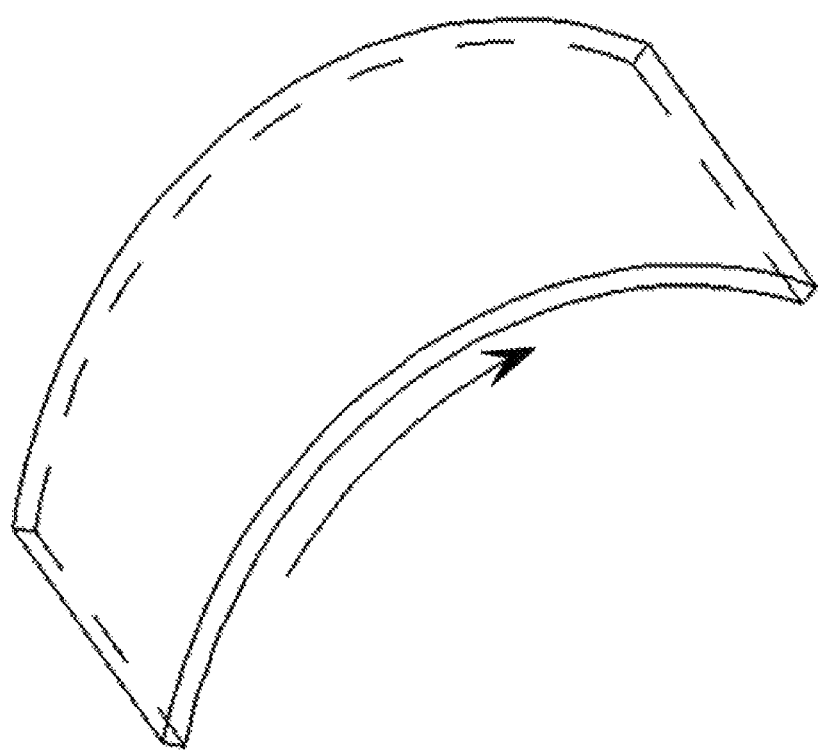
FIG. 18 is a schematic structural view of a blade according to Embodiment 2 of the present invention.

The blade comprises a section of curved plate, the cross section of the curved plate is a gradually-varied arc curve whose curvature progressively increases along a gas flow direction. As illustrated in FIG. 18, according to the actual needs in practice, a combination of the curved plates and straight plates may be employed, and the blades extend at a gradually-bending end of the curved plate to form a section of straight plate, which may reduce the resistance relative to the purely curved plate, as illustrated in FIG. 17.

Embodiment 2

Figure 4:
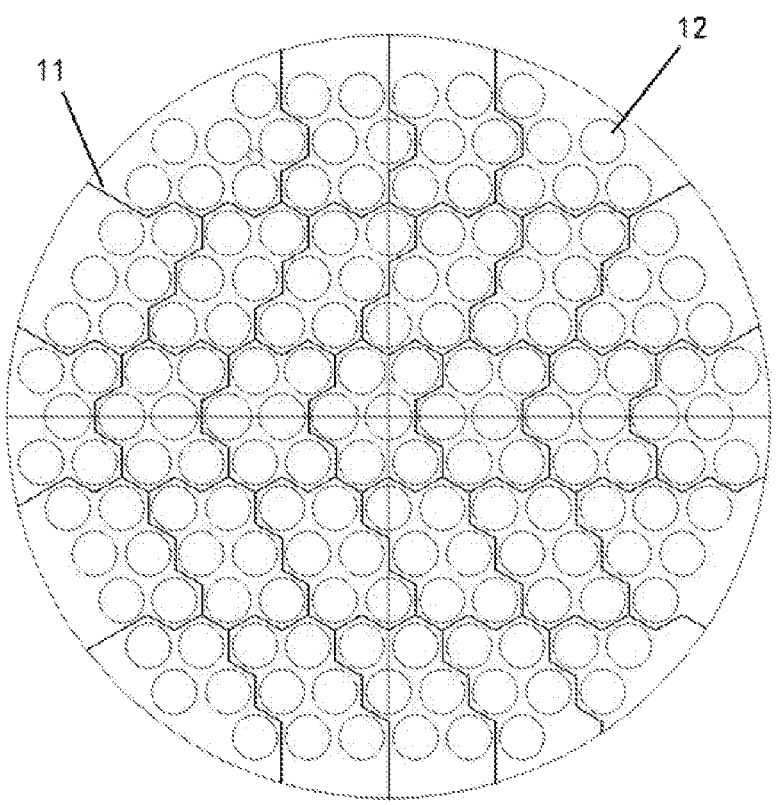
FIG. 4 is a schematic structural view of a demister according to Embodiment 2 of the present invention.
Figure 5:
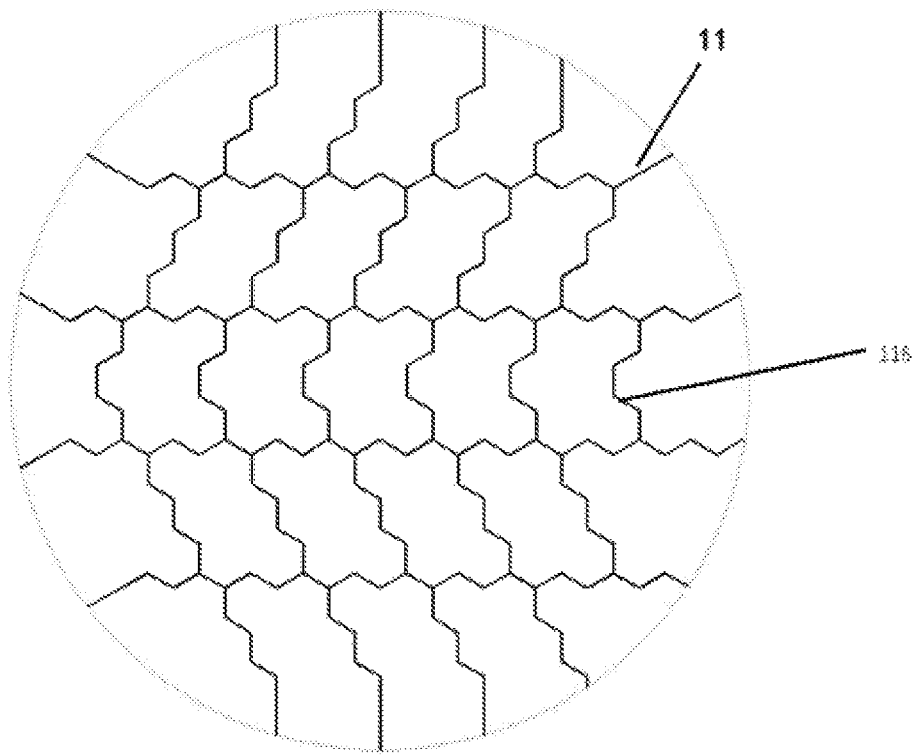
FIG. 5 is a schematic structural view of liquid collection cylinder of the demister according to Embodiment 2 of the present invention.
Figure 6:
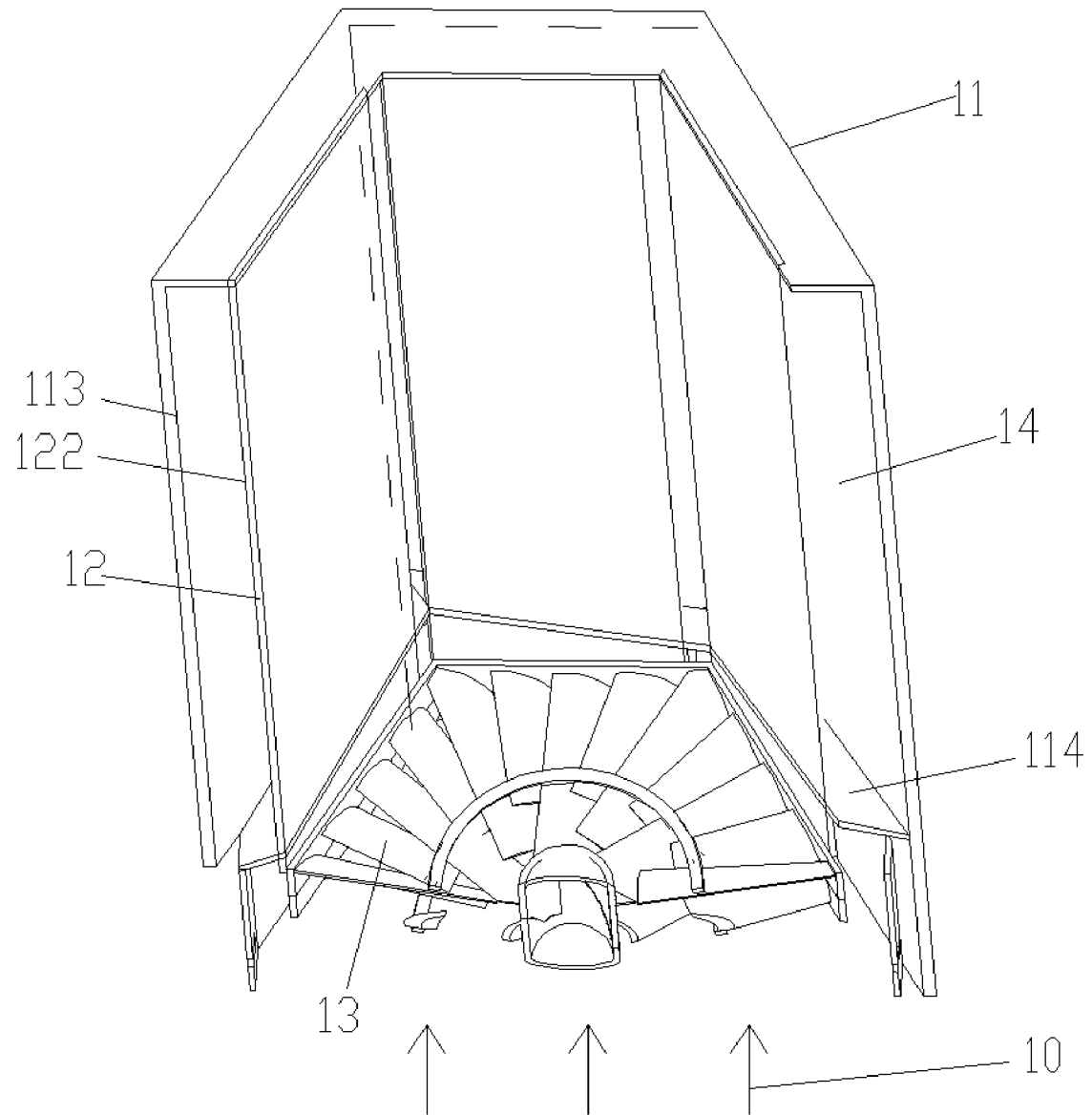
FIG. 6 is one schematic structural partial sectional view of a demisting unit.

Based on Embodiment 1, the cellular structure of the liquid collection cylinder 11 may be further simplified, and the liquid collection cylinder 11 is defined as a structure as illustrated in FIG. 4 and FIG. 5. Each liquid collection cylinder may be provided with a plurality of flow guide cylinders 12, and the wall of the liquid collection cylinder 11 is formed by sequentially splicing several wall plates having an equal width. An included angle between adjacent wall plates is 120 degrees. The recess portion is arranged at the corner of the liquid collection cylinder 11, such that each flow guide cylinder 12 is at least opposite to the wall plates on one side of the liquid collection cylinder.

Embodiment 3

When the demister is used for separating extremely small-particle size mist droplets, for example, mist droplets in the range of tens to hundreds of nanometers, several secondary blade groups 15 may be additionally arranged at the rear section of the primary cyclone blade group 13 in the flow guide cylinder. To prevent an increase of the pressure loss in the demister caused by an increase of the number of layers of blade groups, a central member 151 of the secondary cyclone blade group 15 is defined as a hollow cylinder. However, relative to the position of the gas inlets of the blades of the secondary cyclone blade group 15, the central member 151 extends by a section at the side of incident-flow. Correspondingly, the interlayer chamber is also isolated into separate chamber units, wherein each chamber unit is configured to collect the liquid droplets separated by each layer of cyclone blade group.

Figure 19:
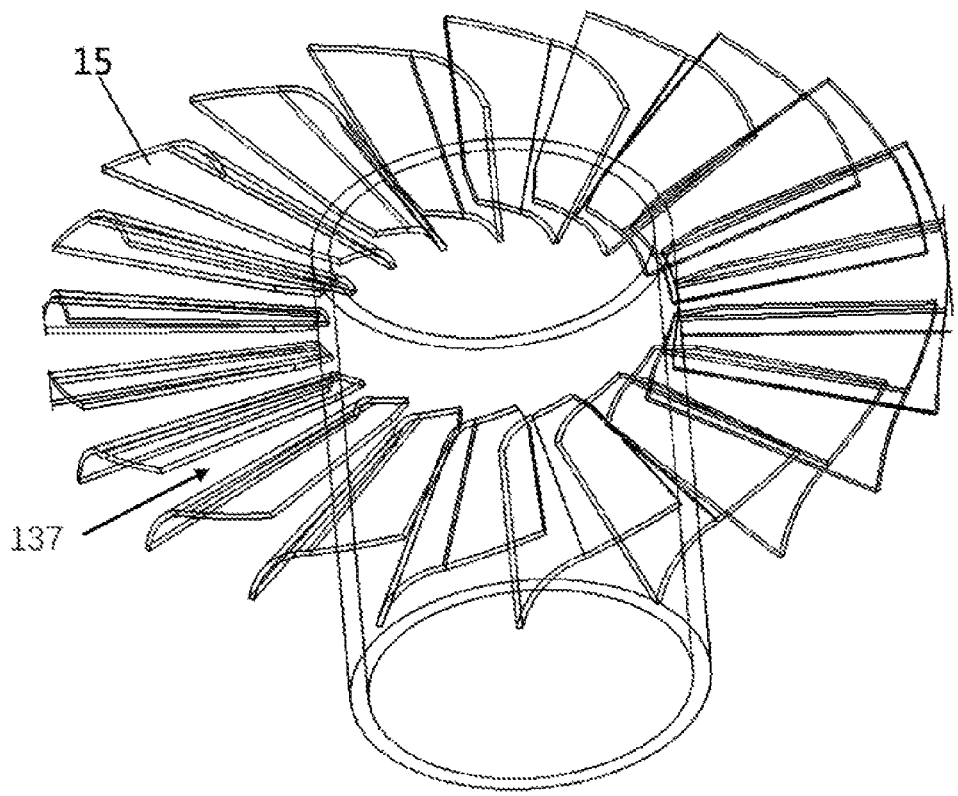
FIG. 19 is a schematic structural view of a secondary blade group.
Figure 20:
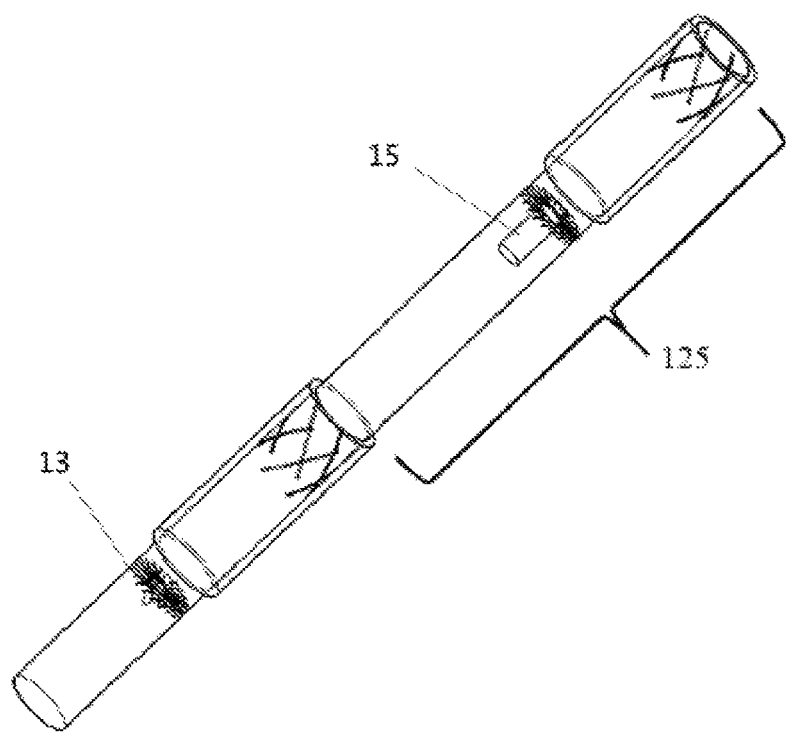
FIG. 20 is a schematic structural view of a demister according to Embodiment 3 of the present invention.
Figure 21:
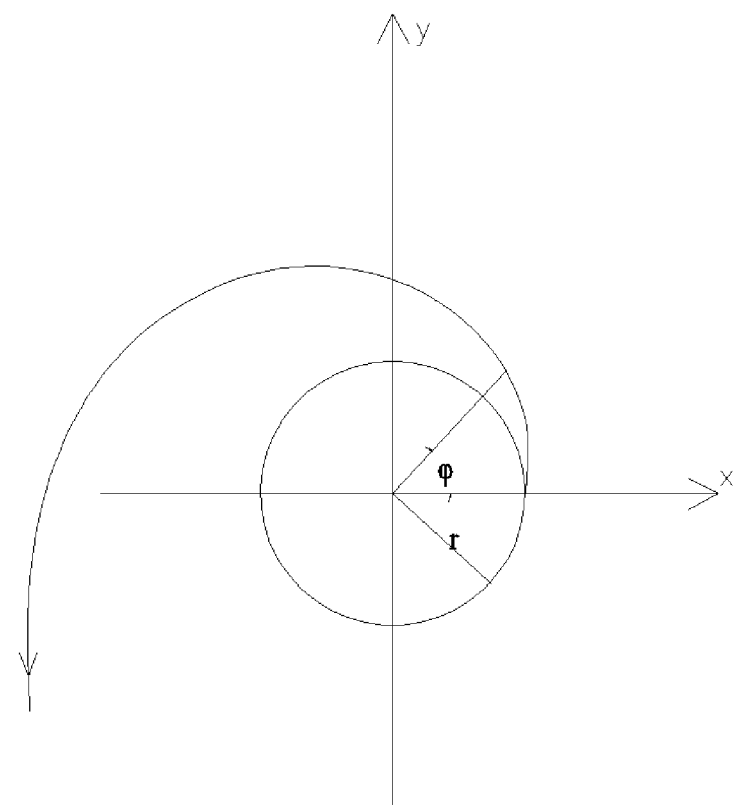
FIG. 21 shows the shape and origin of an involute in the rectangular coordinate system. Preferably, the arc curve (of the flow guide cylinder and the blade) is a corrected involute. That is, first draw a circle with a radius of r (the base circle of the involute), and then divide the circle into equal parts (for example, 12 parts), make a tangent to the circle through each equal point, measure one equal part of the circumference from the tangent point ($\pi D/12$) to get point 1. On the second tangent line, measure two of the circumference from the tangent point Equally divide ($2\pi D/12$) to get point 2, and so on to obtain points 3, 4 . . . , 12. Connect points 1, 2, 3 . . . 12 with a smooth curve to obtain the involute of the circle. The line connecting any point on the involute line is the expansion angle $\Phi$.

As illustrated in FIG. 19 and FIG. 20, a primary cyclone blade group 13 is arranged on the side of a gas inlet of the flow guide cylinder, wherein a layer of secondary cyclone blade group 15 is arranged at a rear section thereof, the chamber units corresponding to the two blade groups are not in communication with each other, and water is discharged respectively.

In the present invention:

The flow guide cylinder 12 may be designed into the following: 1) a straight cylinder, 2) a conical cylinder, and 3) a hybrid of a straight cylinder and a conical cylinder.

Figure 10:
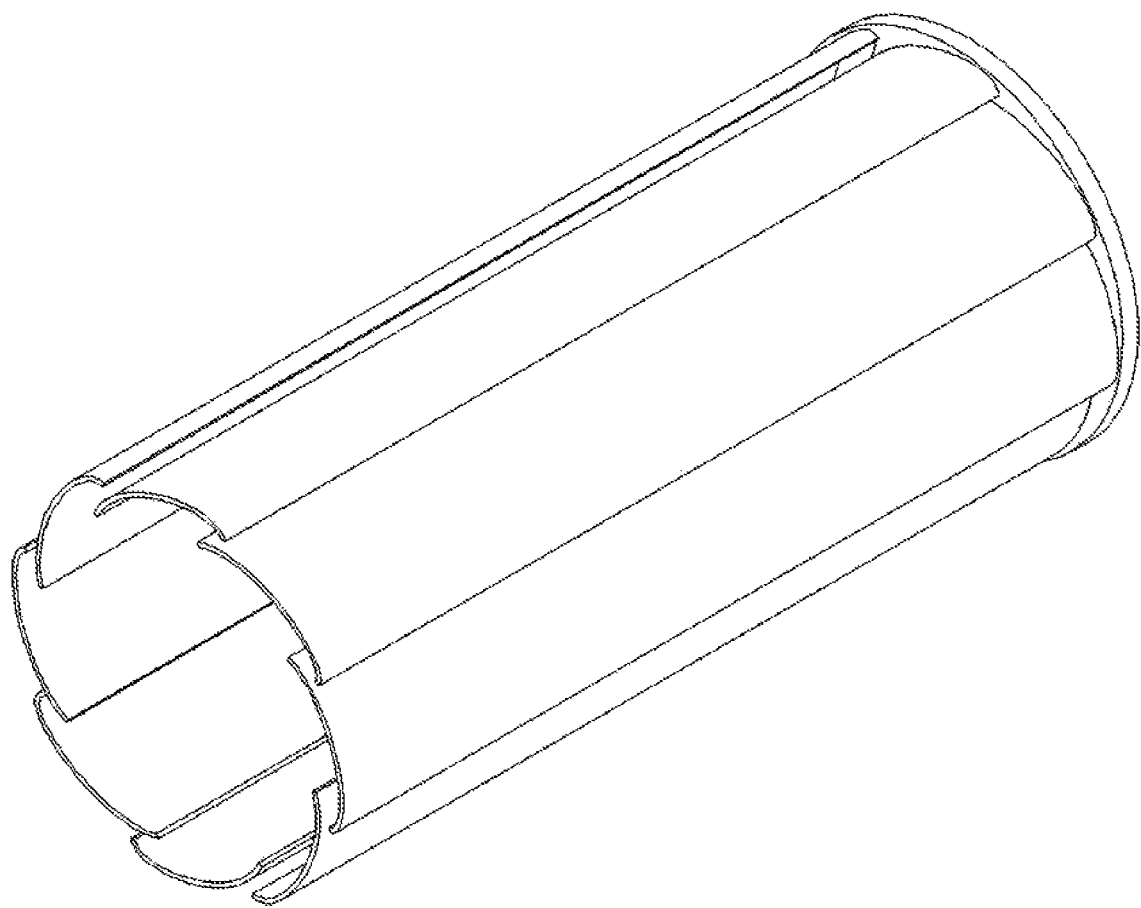
FIG. 10 is a schematic structural view of a flow guide cylinder according to Embodiment 1 of the present invention.
Figure 11:
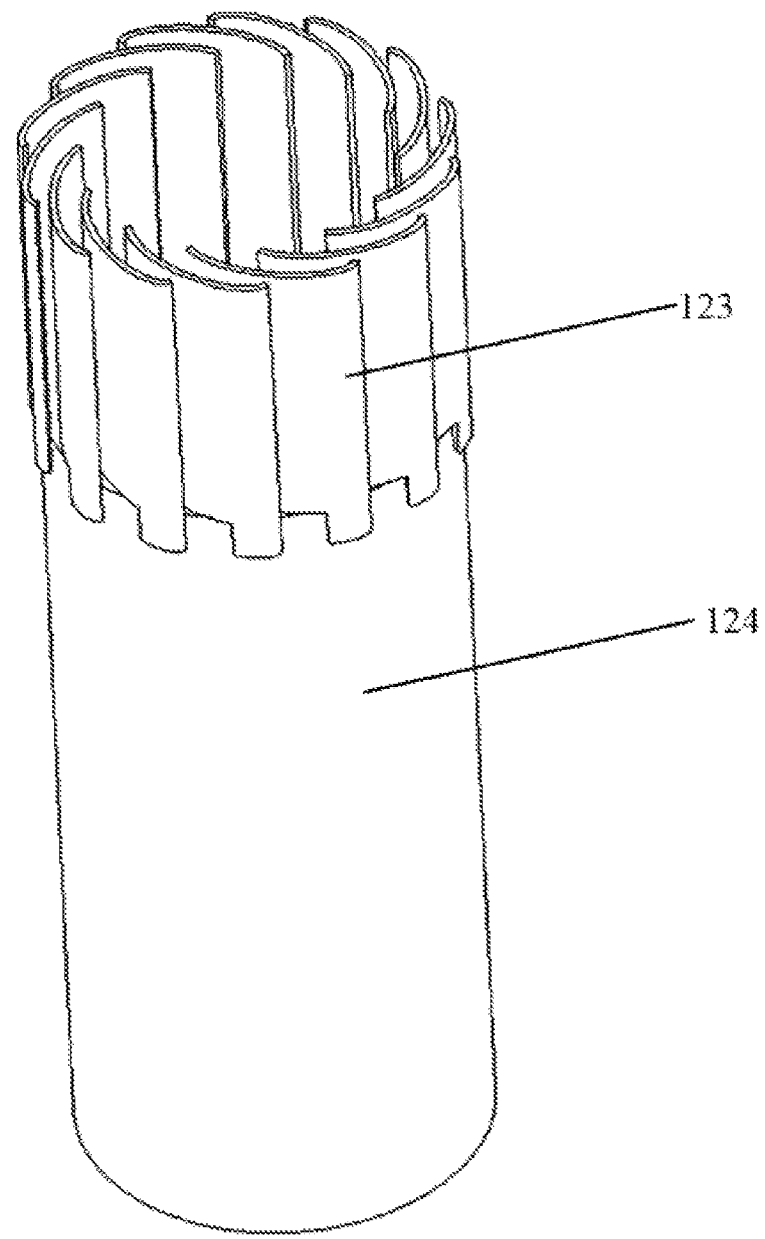
FIG. 11 is a schematic structural view of a flow guide cylinder according to Embodiment 2 of the present invention.
Figure 12:
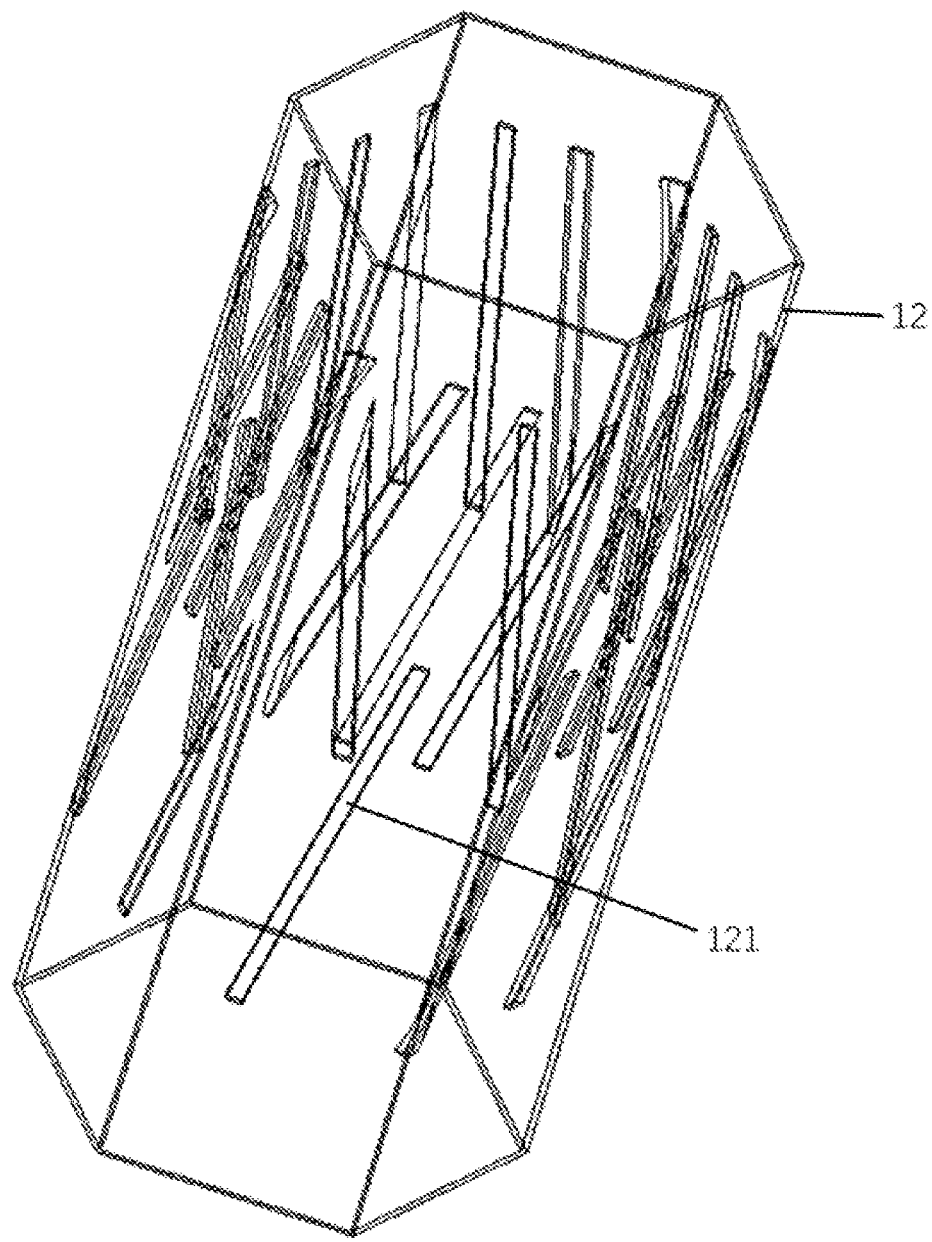
FIG. 12 is a schematic structural view of a flow guide cylinder according to Embodiment 3 of the present invention.

The water permeable structure of the flow guide cylinder 12 may employ any one of the following:

a) a plurality of inclined slots are circumferentially arranged on the wall of the flow guide cylinder 12 to form the water permeable structure, as illustrated in FIG. 12;

b) the entire cylinder body of the flow guide cylinder 12 is formed by enclosure of a plurality of baffles, wherein a gap defined between the baffles to form the water permeable structure, and the baffle is a straight plate or a curved plate, as illustrated in FIG. 10;

Alternatively, the flow guide cylinder 12 is divided into an upper cylinder body and a lower cylinder body. As illustrated in FIG. 11, the lower cylinder body is a straight cylinder or a conical cylinder, and the upper cylinder body is formed by enclosure of a plurality of baffles. Gaps are defined between various baffles to form the water permeable structure. The lower cylinder body may be selectively provided with slots to form the water permeable structure. The baffle is preferably a curved plate, especially a curved plate whose curvature is variable. The conical cylinder has a diameter which progressively decreases from bottom to top (along the gas flow direction).

c) the wall of the flow guide cylinder 12 formed by a water permeable mesh, membrane or filter cloth, and a supporting member for fixing the mesh, membrane and filter cloth.

The baffles of the water permeable structure and the curved plates on the blades are formed on the flow guide cylinder 12, wherein the cross section thereof is an arc surface whose shape is preferably a corrected involute, and the curve equation thereof is as follows:

$$\begin{cases} x = k*r*(\cos\varphi + \varphi*\sin\varphi) \\ y = r*(\sin\varphi - \varphi*\cos\varphi) \\ \varphi = 0\text{-}\pi/2;\ r = 0.5\text{-}10\ \text{mm},\ k = 0.3\text{-}3 \end{cases}$$

wherein φ is a spread angle, r is a base circle radius, and k is a correction coefficient.

In the above embodiment, the mist droplets carried by the gas entering the demister are captured by the blades when passing through the cyclone blade group, and hence a liquid membrane which facilitates subsequent capture of the liquid droplets is formed, such that most of the mist droplets are removed. When the liquid membrane has a specific thickness, a portion of the liquid membranes form liquid droplets and drops down from the blades, and a portion of the liquid membranes are carried by the gas flow to the flow guide cylinder. The gas flowing through a curved cyclone demisting plate forms a rotary flow, and the remaining mist droplets and a portion of the liquid membranes are thrown to the rear of the wall of the flow guide cylinder, enters the interlayer chamber between the flow guide cylinder and the liquid collection cylinder via the water permeable structure on the wall of the flow guide cylinder, and then are discharged.

According to the present invention, the demister employs gradually-bending curved surface separation, inertia separation and the like different treatment manners to treat the gas multiple times, and meanwhile the removed mist droplets are discharged via the liquid collection cylinder. In this way, the stage-wise demisting efficiency against the 10 nanometer mist droplets also reaches 90% or above, and the resistance is only several hundreds of Pas (when the gas flow velocity is 5 m/s).

The basic principle, main features and advantages of the present invention are described and illustrated above. A person skilled in the art would understand that the present invention is not limited to the above embodiments. The above embodiments and description in the specification are only intended to elaborate the principle of the present invention. Various variations and improvements may also be made to the present invention without departing from the spirit and scope of the present invention. The protection scope of the present invention is defined by the appended claims, specification and equivalents thereof.

What is claimed is:

1. A demister, comprising at least one demisting unit; wherein the demisting unit comprises a flow guide cylinder, a primary cyclone blade group mounted at a gas inlet of the flow guide cylinder and a liquid collection cylinder arranged outside the flow guide cylinder, wherein the liquid collection cylinder is provided with at least one flow guide cylinder, a water permeable structure is arranged on a side wall of the flow guide cylinder, and a gap is defined between an outer wall face of the flow guide cylinder and an inner wall face of the liquid collection cylinder and an interlayer chamber is formed;

wherein the primary cyclone blade group comprises a plurality of blades that are annularly arranged and a supporting member for fixing the blades, adjacent blades form an oblique flow passage, and a blade comprises a section of curved plate; wherein a cross section of the curved plate is a gradually-varied arc curve whose curvature progressively increases along a gas flow direction;

wherein the arc curve is a corrected involute, and the curve equation is:

$$\begin{cases} x = k*r*(\cos\varphi + \varphi*\sin\varphi) \\ y = r*(\sin\varphi - \varphi*\cos\varphi) \\ k = 0.3\text{-}3 \end{cases}$$

wherein φ is a spread angle, r is a base circle radius, and k is a correction coefficient;

wherein a bottom plate is arranged under the interlayer chamber, a recess portion is arranged on a wall of the liquid collection cylinder corresponding to at a lowest position; wherein the recess portion is arranged under the lowest position of the bottom plate and is in communication with the interlayer chamber, such that a liquid collected in the interlayer chamber flows out of the liquid collection cylinder via the recess portion;

wherein the liquid collection cylinders of adjacent demisting units are connected to each other via a clamping member; wherein the clamping member is provided with a base, a claw fixed above the base and a water discharge tube connected under the base, when adjacent demisting units are fixed, and the clamping member is clamped at the position of the recess portion of the liquid collection cylinder, such that the recess portion is in communication with the water discharge tube.

2. The demister according to claim 1, wherein the interlayer chamber has a negative pressure in the interior thereof relative to the fluid guide cylinder.

3. The demister according to claim 1, wherein the interlayer chamber is provided with a water absorptive material.

4. The demister according to claim 1, wherein in the flow guide cylinder, at least one layer of secondary cyclone blade group is further arranged on a rear section of the primary cyclone blade group at the gas inlet; wherein a central member of the secondary cyclone blade group is defined as a hollow cylinder, and the central member extends out by a section at an incident-flow side relative to the position of a gas inlet of the secondary cyclone blade group.

5. The demister according to claim 4, wherein the secondary cyclone blade group comprises a plurality of blades that are annularly arranged and a supporting member for fixing the blades, adjacent blades form an oblique flow passage, and a blade comprises a section of curved plate; wherein a cross section of the curved plate is said gradually-varied arc curve whose curvature progressively increases along a gas flow direction.

6. The demister according to claim 5, wherein the blade extends at a gradually-bending end of the curved plate to form a section of straight plate.

7. The demister according to claim 1, wherein the wall of the liquid collection cylinder is constituted by several wall plates in sequence, an included angle of adjacent wall plates being 120 degrees, and the recess portion is arranged at the corner of the liquid collection cylinder.

8. The demister according to claim 1, wherein the water permeable structure of the flow guide cylinder is any one of the following:

a) the wall of the flow guide cylinder is circumferentially provided with the water permeable structure formed by a plurality of slots;

b) the entire or partial cylinder body of the flow guide cylinder is formed by enclosure of a plurality of baffles, wherein a gap defined between the baffles to form the water permeable structure, and the baffle is a straight plate or a curved plate; and c) the wall of the flow guide cylinder is provided with a water permeable mesh, membrane or filter cloth.

9. The demister according to claim 8, wherein a cross section of the curved plate is said arc curve.

* * * * *